United States Patent [11] 3,586,414

[72] Inventor Donald Herbert Schultz
 Black Forest South Australia, Australia
[21] Appl. No. 824,160
[22] Filed May 13, 1969
[45] Patented June 22, 1971
[73] Assignee Sola International Pty. Ltd.
 Black Forest, Australia
[32] Priority May 16, 1968
[33] Australia
[31] 37952/68

[54] BINOCULAR VIEWING DEVICE
 7 Claims, 5 Drawing Figs.
[52] U.S. Cl. .................................................... 350/146,
 350/137, 350/141, 350/143, 351/6, 351/41,
 351/158
[51] Int. Cl. ...................................................... G02b 25/02,
 A61b 3/10
[50] Field of Search .......................................... 350/137,
 138, 141, 143, 145, 146, 130, 212, 159; 351/1, 6,
 9, 16, 41, 158

[56] References Cited
 UNITED STATES PATENTS
1,615,067 1/1927 Boerman .................. 351/158 X
1,741,264 12/1929 Wappler .................. 315/158 X
2,295,243 9/1942 Steinman ................. 350/137 X
2,387,758 10/1945 Jaros ...................... 350/145 X
2,559,698 7/1951 Bahre ...................... 350/145
2,757,574 8/1956 Thorburn .................. 315/6 X
3,014,405 12/1961 Swikart .................... 350/146
3,035,483 5/1962 Andreas et al. ........... 351/16 X
3,067,648 12/1962 Cohen ...................... 350/145 X
3,458,246 7/1969 Krebs ...................... 350/146
 FOREIGN PATENTS
896,127 1953 Germany .................. 350/146

Primary Examiner—David Schonberg
Assistant Examiner—Paul A. Sacher
Attorney—Wofford and Felsman ABSTRACT: A binocular-viewing device suitable for use by opthalmologists containing binocular-viewing means with a double mirror reflector system and a lamp housing for illuminating an object, the lamp housing having a curved reflector and a lens system constituted by a single element having an aspherical face. So that the illuminating efficiency is high, the size and weight of the lamp and lamp housing is small and consequently the size and weight of the headpiece is small and can be carried on a spectacle frame.

BINOCULAR VIEWING DEVICE

This invention relates to a binocular-viewing device suitable for wearing by an ophthalmologist.

In ophthalmology one of the problems which is encountered is that the users head is so large that illumination from behind the head becomes ineffective, and another problem which is encountered is the difficulty of achieving proper stereopsis so that third dimensions can be readily identified.

To meet these problems ophthalmoscopes have been proposed having a headband, a lamp housing and reflector assembly on the headband for directing a beam of light (for example through the pupil opening of the eye of a patient), and a binocular-viewing arrangement.

To effectively concentrate the light, however, it has been usual to employ a lens system having a series of elements, each with two surfaces and therefore having considerable light loss. This in turn has required the use of a high wattage globe (usually about 20 watts), and a flexible lead to a power transformer, which restricts freedom of movement by the user. Furthermore the equipment is heavy (often about 2,000 grams in weight), and the heat conducted and radiated from the light source is uncomfortable for the user.

An object of this invention is to provide a more efficient light system which in turn will reduce weight and discomfort for the user, and a further object is to provide means which will greatly reduce the heat felt by the user.

The invention in one of its forms may include an illuminating headpiece having a headpiece housing containing binocular-viewing means, a lamp housing carried by the headpiece housing, a lamp in the lamp housing, a curved reflector at the rear of the lamp, and a lens system at the front of the lamp, the lens system being constituted by a single element having an aspheric face.

By using a reflector at the rear of the lamp, heat as well as light is reflected away from the users forehead. By employing an aspheric surface on the lens, it becomes possible (contrary to expectation) to utilize a system having a single lens element, with consequential savings in losses. The higher efficiency obtained thereby enables use to be made of a small globe 6 watts being satisfactory), and the power for this globe can conveniently come from a bank of dry cells carried by the user.

It is desirable for a user to have good surround visibility, and to achieve this the invention may include as a feature a headpiece being secured to a pair of spectacle lenses held in a rigid frame, the headpiece housing containing two pairs of mirrors, the lens system of the small lamp housing directing a beam of light to an object to be viewed through the spectacles.

If the device is used in conjunction with spectacles, the users defects of vision can be corrected in the normal way by spectacle lenses, so that a single device for example can be used by people with varying defects of vision by securing the device to any one of a plurality of spectacles.

If two pairs of mirrors are used, one pair for each eye, it is possible to have the observation at a small angle so that a whole image can be viewed in full stereopsis. If the device is to be used for ophthalmology, the retina of the eye being studied becomes an illuminated object, and it is possible for the stereopsis to exist even on the retina itself. It also becomes possible (by use of a small angle) to obtain a wide field of view on the retina.

An embodiment of the invention is described hereunder in some detail with reference to and is illustrated in the accompanying drawings, in which.

Figure 1:
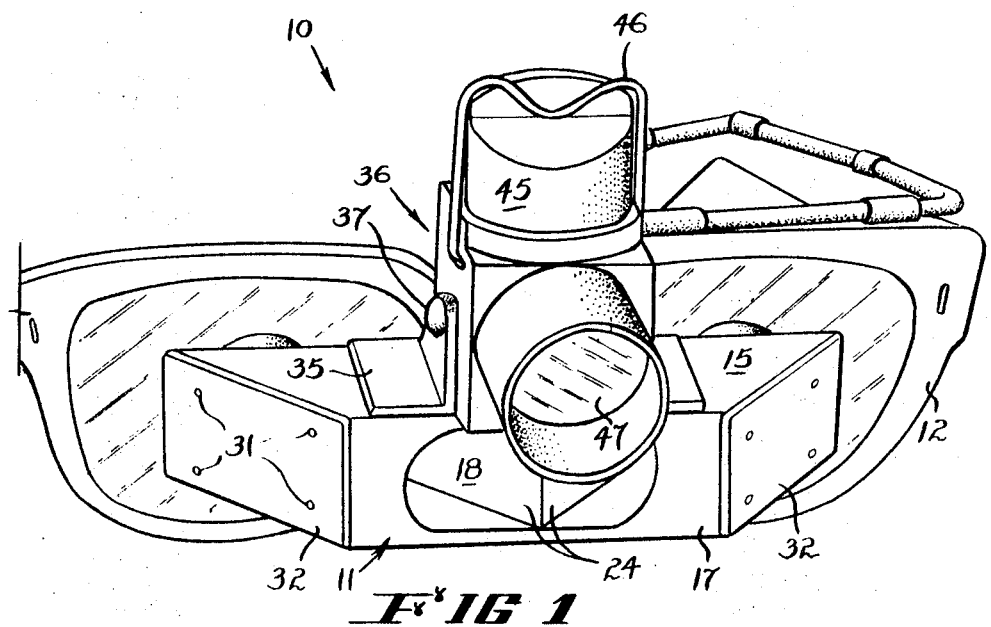
FIG. 1 is a perspective view of an illuminating headpiece.
Figure 2:
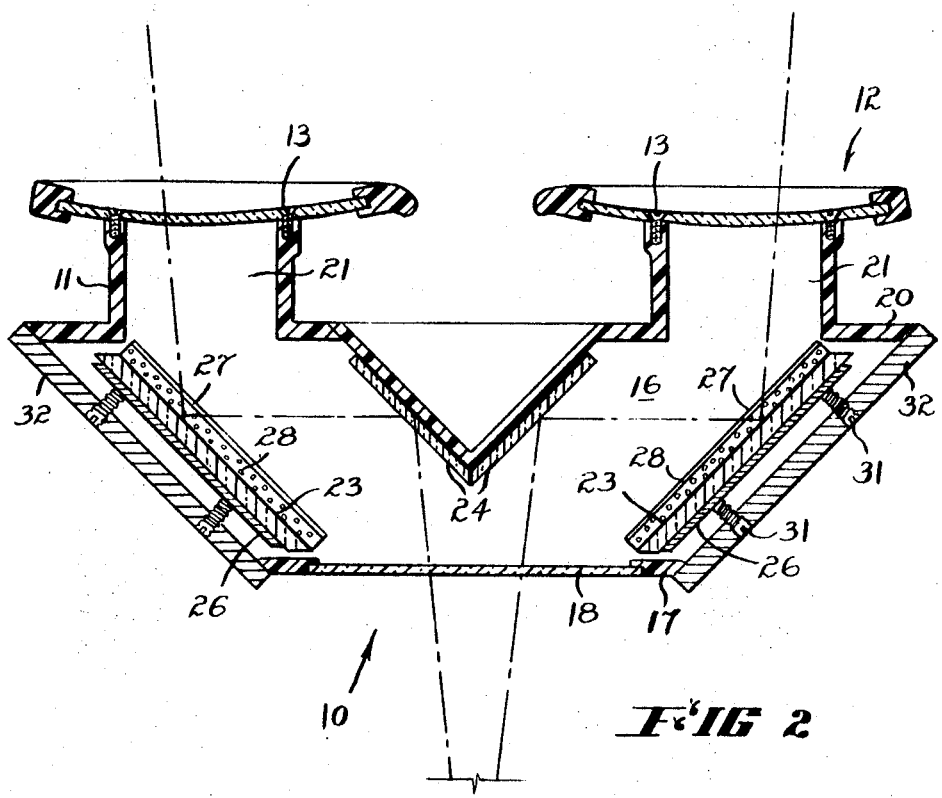
FIG. 2 is a central plan section, through the headpiece housing.
Figure 3:
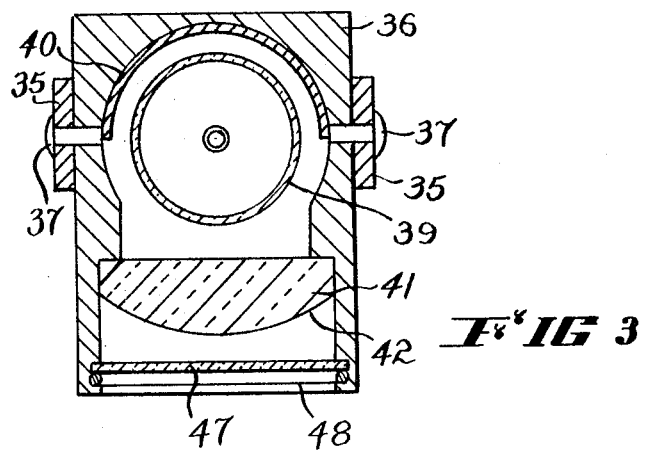
FIG. 3 is a central plan section through the lamp housing.

According to this embodiment an illuminated headpiece 10 comprises a headpiece housing 11 arranged to be secured to a pair of spectacles 12 by screws 13, as shown in FIG. 2. The housing 11 is provided with upper and lower walls 15 and 16 respectively, and a front wall 17 containing a front window 18. The rear wall 20 of the housing is provided with a pair of apertures 21 arranged at a spacing to suit the pupillary distance between a users eyes, and the arrangement is such that the vision of the two eyes is directed to each of two primary mirrors 23, reflected at right angles by the primary mirrors 23 to secondary mirrors 24 which are disposed centrally, and then by the secondary mirrors at a small angle to intersect on an object plane at a useful distance in front of the headpiece housing 11.

To achieve a high efficiency, the mirrors 23 and 24 are flat, are vacuum coated, and are thin to be of lightweight. Strength is attained, in the case of the primary mirrors 23, by metal backing plates 26, which are connected to flanges 27 on the upper and lower walls 15 and 16 by respective soft rubber strips 28 cemented between the mirrors 23 and the flanges 27. (Alternatively spring metal retaining plates may be used in lieu of rubber strips 28.)

It has been customary in previously proposed ophthalmoscopes to accommodate varying pupillary distances with adjustable slides, and this has contributed to weight and inaccuracies. In this embodiment however adjusting screws 31 threadably engage sidewall access plates 32 and bear against respective backing plates 26 to provide angular adjustment enough to connect any manufacturing inaccuracies.

The upper wall 15 of the headpiece housing 11 is provided with a lamp housing support 35 to which is hinged a lamp housing 36. The lamp housing 36 is pivoted on a pair of aligned pins.

The lamp housing 36 contains a lamp 39 of small dimension and low power, the back of the lamp being provided with a hemispherical reflector 40 so that the effective angle of illumination can be increased, this giving more effective illumination and at the same time increasing heat dissipation from the housing or reducing the heat loading of the housing. The front of the lamp housing is provided a lens system which consists of a single condenser lens 41 having an aspheric face 42, the lens directing a beam of light to the object plane, and this direction is adjustable by simply swiveling the lamp housing 36 on its support pins 37.

Figure 4:
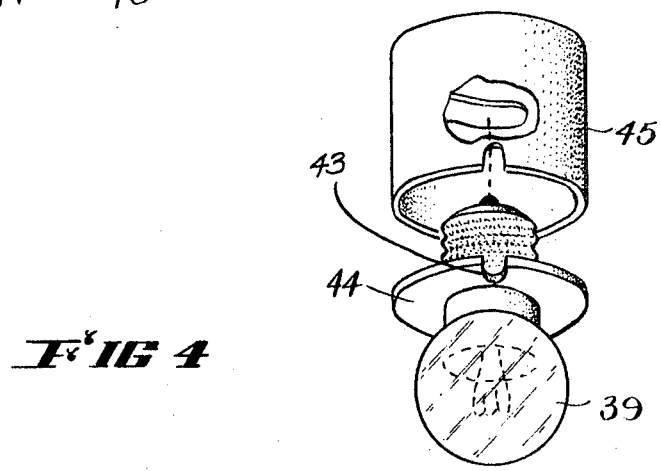
FIG. 4 is a fragmentary "exploded" perspective view showing the lamp and lamp retaining means.
Figure 5:
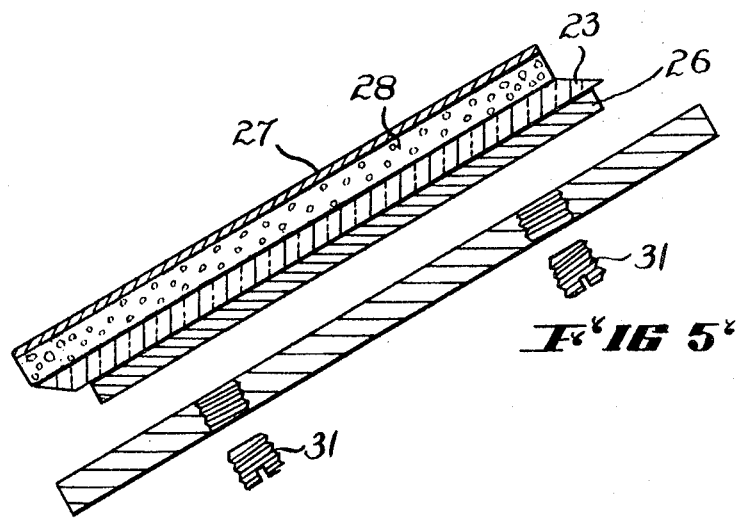
FIG. 5 is a fragmentary section showing reflector adjustment means (drawn to an enlarged scale).

Since it is difficult to obtain lamps having identical dimensional characteristics, and use of a single lens requires accurate positioning of the lamp, the lamp is prefocussed in a jig (not shown), and when in its correct position is soldered to a support ring 44 (FIG. 4) having a locating notch 43 in its periphery, the support ring 44 being held against a shoulder (not shown) in the housing 36 by a cylindrical retaining member 45, held in place by a hinged spring wire clip 46. By these means the lamp filament will be on the central axis of the lens, notwithstanding manufacturing variations which may result in an incorrectly positioned filament.

The lamp housing 36 is essentially small in dimension, and itself forms a heat shield to reduce radiation, and there also exists a gap between the back of the housing and the users head. Thus the discomfort to the user due to excessive heat is reduced considerably.

There is a second discomfort due to high concentration of infrared radiation in the anterior part of the patient's eye, and to reduce this an infrared filter 47 is retained in front of the lens 41 by a circular clip 48.

The arrangement is such that the device can be used for ophthalmic purposes, and the retina of a patient's eye can be viewed with the beam of light directed through the pupil opening, as well as having the two lines of sight passing through the pupil opening. The retina then becomes the illuminated object which is viewed with a low magnification and a wide field of view.

The power supply for the small lamp used can conveniently be a pack of batteries which can be carried for example in the pocket of a user, and under these circumstances it will be seen that the device is very much smaller dimensionally, lighter in weight (about 140 grams in weight) and more comfortable to use than previously proposed devices which have used higher powered larger lamps carried by the user, and usually supplied from a power supply point.

The optical design enables a wide range of corneal-vertex to instrument distances to be tolerated, and, along with the mirror adjustment device enables a single instrument to be useful for people having widely variable personal vision characteristics. Two sizes of instrument are found to meet most requirements encountered, with provision for some pupillary distance overlap.

What I claim is:

1. A binocular-viewing device having a headpiece, a headpiece housing containing binocular-viewing means including a pair of spaced apertures arranged at a spacing to accommodate the pupillary distance between a user's eyes, means mounting said housing on said headpiece a lamp housing carried by and extending upwardly from the headpiece housing, a lamp positioned within the lamp housing with its central axis extending vertically, a curved reflector at the rear of the lamp, a lens system at the front of the lamp, the lens system being constituted by a single element having an aspheric face, the curved reflector and the lens system having a common axis, pivot means, said pivot means connecting the lamp housing to the headpiece housing whereby the direction of light transmitted by the lamp housing is varied when the lamp housing is tilted, a support ring secured to the lamp and engaging in the lamp housing, the relative location of the support ring and the lamp filament being at a distance from one another such that said axes intersect and the lamp filament is substantially on the central axis of the reflector and lens system.

2. A binocular-viewing device according to claim 1 further comprising a retaining member engageable within the lamp housing and against the support ring, and a spring wire clip hinged to the housing and resiliently engaging the retaining member thereby retaining it in the lamp housing.

3. A binocular-viewing device according to claim 1 further comprising an infrared filter in the lamp housing positioned in front of the lens.

4. A binocular-viewing device according to claim 1 and further comprising means securing the headpiece housing to the lenses of a pair of spectacles, the spectacles having a rigid frame, said spaced apertures being adjacent the outer faces of the spectacle lenses.

5. A binocular-viewing device according to claim 4 wherein the headpiece further comprises two pairs of spaced substantially parallel mirrors, the mirrors of each pair being substantially at right angles to those of the other pair and arranged to reflect diverging light entering the headpiece outwardly through the apertures to thereby provide stereopsis when viewed through the apertures.

6. A binocular-viewing device according to claim 5 further comprising resilient mounting means retaining the outer mirror of each pair within the headpiece housing and screw-threaded adjustment means cooperable with the mirror to vary the mirror position by resilient deformation of the mounting means.

7. A binocular-viewing device according to claim 6 further comprising a backing plate on the mirror, said screw-threaded adjustment means comprising a plurality of screws threadably engaging the headpiece housing and abutting the backing plate.